(12) United States Patent
Shi et al.

(10) Patent No.: US 12,149,926 B2
(45) Date of Patent: Nov. 19, 2024

(54) METHOD, APPARATUS AND SYSTEM FOR MOBILITY CONTROL

(71) Applicant: ZTE CORPORATION, Guangdong (CN)

(72) Inventors: Xiaojuan Shi, Shenzhen (CN); He Huang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 409 days.

(21) Appl. No.: 17/512,775

(22) Filed: Oct. 28, 2021

(65) Prior Publication Data

US 2022/0167233 A1 May 26, 2022

Related U.S. Application Data

(63) Continuation of application No. PCT/CN2019/085319, filed on Apr. 30, 2019.

(51) Int. Cl.
*H04W 36/00* (2009.01)
*H04W 36/32* (2009.01)
*H04W 76/30* (2018.01)

(52) U.S. Cl.
CPC ....... *H04W 76/30* (2018.02); *H04W 36/0058* (2018.08); *H04W 36/0061* (2013.01); *H04W 36/00698* (2023.05); *H04W 36/00837* (2018.08)

(58) Field of Classification Search
CPC ........... H04W 76/30; H04W 36/00837; H04W 36/0058; H04W 36/32; H04W 36/0061; H04W 36/34; H04W 36/0069
See application file for complete search history.

(56) References Cited

U.S. PATENT DOCUMENTS

2017/0311211 A1 10/2017 Chiba et al.
2020/0169906 A1* 5/2020 Tsuboi ............. H04W 36/0085
(Continued)

FOREIGN PATENT DOCUMENTS

CN 107005907 A 8/2017
CN 108282836 A 7/2018
(Continued)

OTHER PUBLICATIONS

First Office Action for CN Appl. No. 2019800955282, dated Jul. 8, 2022 (with English translation, 33 pages).
(Continued)

*Primary Examiner* — Brian D Nguyen
(74) *Attorney, Agent, or Firm* — Foley & Lardner LLP

(57) ABSTRACT

Method, systems and devices for a master node which is accessed by a user equipment, UE, the UE accessed a source secondary node are provided. The method comprises transmitting, to the target secondary node, an addition request message, receiving, from the target secondary node, an addition request acknowledge message with identification information of a target primary secondary cell in response to the addition request message, determining at least one mobility triggering condition of the target primary secondary cell, and transmitting, to the UE, a secondary node change type message having the at least one mobility triggering condition of the target primary secondary cell, to make the UE perform a handover from the source secondary node to the target secondary node when determining the target primary secondary cell meets at least one of the at least one mobility condition.

18 Claims, 19 Drawing Sheets

(56) References Cited

U.S. PATENT DOCUMENTS

2021/0211899 A1* 7/2021 Koziol .................. H04W 24/10
2021/0378046 A1* 12/2021 Shimoda ................ H04B 7/022
2023/0354065 A1* 11/2023 Zhang .................. H04W 76/20

FOREIGN PATENT DOCUMENTS

| CN | 108811004 A | 11/2018 | |
| EP | 3 316 625 A1 | 5/2018 | |
| WO | WO-2017/020253 A1 | 2/2017 | |
| WO | WO 2018/083239 A1 * | 5/2018 | ............ H04W 36/00 |
| WO | WO-2018/175721 A1 | 9/2018 | |
| WO | WO-2018/196083 A1 | 11/2018 | |

OTHER PUBLICATIONS

HTC, "SN change considerations for delta configuration" 3GPP TSG RAN WG3#Meeting 97bis, R3-173867, Oct. 9, 2017, Prague, Czech Republic (4 pages).
HUAWEI: "Enabling fast SN change" 3GPP TSG-RAN3 Meeting #103; R3-190533; Mar. 1, 2019; Athens, Greece (4 pages).
International Search Report and Written Opinion for PCT Appl. No. PCT/CN2019/085319, mailed Dec. 30, 2019 (6 pages).
3GPP "3rd Generation Partnership Project; Technical Specification Group Radio Access Network; Evolved Universal Terrestrial Radio Access (E-UTRA) and NR; Multi-connectivity; Stage 2 (Release 15)", 3GPP Standard; Technical Specification; 3GPP Specification; 3GPP TS 37.340, 3rd Generation Partnership Project (3GPP), Mobile Competence Centre; Apr. 9, 2019, pp. 1-68.
Extended European Search Report on Application No. 19927069.5 dated Nov. 16, 2022, p. 17.

* cited by examiner

METHOD, APPARATUS AND SYSTEM FOR MOBILITY CONTROL

CROSS-REFERENCE TO RELATED APPLICATION

This application claims the benefit of priority under 35 U.S.C. § 120 as a continuation of PCT Patent Application No. PCT/CN2019/085319, filed on Apr. 30, 2019, the disclosure of which is incorporated herein by reference in its entirety.

TECHNICAL FIELD

This application is directed generally to wireless communications, and more particularly, to methods, apparatuses and systems for improving the mobility reliability of wireless communications.

BACKGROUND

Mobility performance is one of the most important performance metrics for long term evolution (LTE) and 5th Generation (5G) new radio (NR). In addition to traditional voice and internet data service, lots of innovative services appear with various quality of service (QoS) requirements in recent years. For example, modern services such as remote control, aerial, industrial automation, industrial control, Augmented Reality (AR) and Virtual Reality (VR) require the network with ultra-reliability and low latency. That is, the mobility performance of the network for such services should be equipped with reliability (robust) and very low interruption time. For example, a latency target of the interruption time during handover in the network should be as small as possible (i.e. close to 0 ms). Thus, the mobility performance with the interruption time approximating to 0ms and reliability is an important.

SUMMARY

The example embodiments disclosed herein are directed to solving the issues relating to one or more of the problems presented above, as well as providing additional features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

This document relates to methods, systems, and devices for improving the mobility reliability of wireless communications.

The above and other aspects and their implementations are described in greater detail in the drawings, the descriptions, and the claims.

The present disclosure relates to a method for a master node which is accessed by a user equipment, UE, accessing a source secondary node (i.e. the UE accessed the source secondary node). The method includes transmitting, to a target secondary node, an addition request message, receiving, from the target secondary node, an addition request acknowledge message with identification information of a target primary secondary cell in response to the addition request message, determining at least one mobility triggering condition of the target primary secondary cell, and transmitting, to the UE, a secondary node change type message having the at least one mobility triggering condition of the target primary secondary cell, to make the UE perform a handover from the source secondary node to the target secondary node when determining the target primary secondary cell meets at least one of the at least one mobility condition.

In some embodiments, the addition request message comprises a conditional indication and the target secondary node generates the identification information of the target primary secondary cell in the addition request acknowledge message in response to the conditional indication of the addition request message.

In some embodiments, the identification information is an information element of the addition request acknowledge message.

In some embodiments, the identification information is included in a radio resource control message included in the addition request acknowledge message.

In some embodiments, the radio resource control message included in the addition request acknowledge message is a Cell-Group-Config, CG-Config, message.

In some embodiments, the identification information of the target primary secondary cell includes a frequency and a physical cell identity of the target primary secondary cell.

In some embodiments, the identification information of the target primary secondary cell includes a cell global identifier of the target primary secondary cell.

In some embodiments, the method further includes transmitting, to the source secondary node, a release request message after receiving the addition request acknowledge message, to initiate a release process, and receiving, from the source secondary node, a release request acknowledge message in response to the release request message, wherein the release request message comprises a conditional indication for indicating the secondary node that the release process is a condition based procedure.

In some embodiments, the method further includes determining at least one leaving message triggering condition after receiving the addition request acknowledge message, and transmitting, to the UE, the at least one leaving message triggering condition in the secondary node change type message.

In some embodiments, the method further includes receiving, from the UE, a leaving message when the UE determines that the target primary secondary cell meets at least one of the at least one leaving message triggering condition, transmitting, to the source secondary node, a release request message after receiving the leaving message, to start a release process, and receiving, from the source secondary node, a release request acknowledge message in response to the release request message, wherein the release request message comprises a conditional indication for indicating the secondary node that the release process is a condition based procedure.

In some embodiments, the method further includes receiving, from the source secondary node, at least one of a sequence number status transfer and data of unfinished data communications between the source secondary node and the UE, and transmitting, to the target secondary node, the at least one of received sequence number status transfer and received data of the unfinished data communications between the source secondary node and the UE.

In some embodiments, the leaving message is at least one of a measurement report, a radio resource control message and a medium access control, MAC, control element, CE.

In some embodiments, the leaving message comprises information of identifying the target primary secondary cell.

In some embodiments, the information of identifying the target primary secondary cell comprises at least one of the identification information of the target primary secondary cell, an identity of the fulfilled leaving message triggering condition, and an index of the target primary secondary cell, and the master node associates the identity of the at least one leaving message triggering condition when determining the at least one leaving message triggering condition.

In some embodiments, the conditional indication is an information element of the release request message.

In some embodiments, the conditional indication is a Cause value of the release request message.

In some embodiments, the conditional indication is included in a radio resource control message included in the release request message.

In some embodiments, the radio resource control message included in the release request message is a Cell-Group-ConfigInfo, CG-Configinfo, message.

The present disclosure also relates to a method for a target secondary node. The method includes receiving, from a master node, an addition request message, and transmitting, to the master node, an addition request acknowledge message with identification information of a target primary secondary cell in response to the addition request message.

In some embodiments, the addition request message comprises a conditional indication and the method further includes generating the identification information of the target primary secondary cell in the addition request acknowledge message in response to the conditional indication of the addition request message.

In some embodiments, the identification information is an information element of the addition request acknowledge message.

In some embodiments, the identification information is included in a radio resource control message included in the addition request acknowledge message.

In some embodiments, the radio resource control message included in the addition request acknowledge message is a Cell-Group-Config, CG-Config, message.

In some embodiments, the identification information of the target primary secondary cell includes a frequency and a physical cell identity of the target primary secondary cell.

In some embodiments, the identification information of the target primary secondary cell includes a cell global identifier of the target primary secondary cell.

The present disclosure also relates to a method for a user equipment accessed a master node and a source secondary node. The method includes receiving a secondary node change type message, from the master node, with at least one mobility triggering condition of a target primary secondary cell, determining whether the target primary secondary cell fulfills the at least one mobility triggering condition, and accessing the target secondary node when the target primary secondary cell fulfills the at least one mobility triggering condition.

In some embodiments, the method further includes receiving at least one leaving message triggering condition in the secondary node change type message, determining whether the target primary secondary cell fulfills the at least one mobility triggering condition, and transmitting, to the master node, a leaving message of initiating a release process in the source secondary node.

In some embodiments, the leaving message is at least one of a measurement report, a radio resource control message and a medium access control, MAC, control element, CE.

In some embodiments, the leaving message comprises information of identifying the target primary secondary cell.

In some embodiments, the information of identifying the target primary secondary cell comprises at least one of the identification information of the target primary secondary cell, an identity of the fulfilled leaving message triggering condition, and an index of the target primary secondary cell.

The present disclosure also relates to a method for a master node which is accessed by a user equipment, UE, accessed a source secondary node. The method includes receiving, from the source secondary node, a change required message, transmitting, to a target secondary node, an addition request message in response to the change required message, receiving, from the target secondary node, an addition request acknowledge message with identification information of a target primary secondary cell in response to the addition request message, and transmitting, to the UE, a secondary node change type message having at least one mobility triggering condition of the primary secondary cell, to make the UE perform a handover from the source secondary node to the target secondary node when determining the target primary secondary cell meets at least one of the at least one mobility triggering condition.

In some embodiments, the change required message comprises the at least one mobility triggering condition of the target primary secondary cell.

In some embodiments, the change required message comprises a conditional indication for indicating the master node a secondary node change procedure indicated by the change required message is a condition based procedure.

In some embodiments, the method further includes determining the at least one mobility triggering condition of the target primary secondary cell after receiving the addition request acknowledge message.

In some embodiments, the method further includes transmitting, to the source secondary node, a release request message after receiving the addition request acknowledge message, and receiving, from the source secondary node, a release request acknowledge message in response to the release request message, wherein the release request message comprises the identification information of the target primary secondary cell.

In some embodiments, the release request acknowledge message comprises the at least one mobility triggering condition of the target primary secondary cell.

In some embodiments, the release request acknowledge message comprises at least one leaving message triggering condition.

In some embodiments, the method further includes transmitting, to the UE, at least one leaving message triggering condition in the secondary node change type message, and receiving, from the UE, a leaving message when the UE determines the target primary secondary cell meets one of the at least one leaving message triggering condition.

In some embodiments, the change required message comprises the at least one leaving message triggering condition.

In some embodiments, the method further includes receiving, from the source secondary node, at least one of a sequence number status transfer and data of the unfinished data communications between the source secondary node and the UE, and transmitting, to the target secondary node, the at least one of received sequence number status transfer and received data of the unfinished data communications between the source secondary node and the UE.

In some embodiments, the leaving message is at least one of a measurement report, a radio resource control message and a medium access control, MAC, control element, CE.

In some embodiments, the leaving message comprises information of identifying the primary secondary cell.

In some embodiments, the information of identifying the primary secondary cell comprises at least one of the identification information of the primary secondary cell, the identity of the fulfilled leaving message triggering condition, and an index of the target primary secondary cell, wherein the master node associates the at least one leaving message triggering condition and the index to the target primary secondary cell when determining the at least one leaving message triggering condition.

In some embodiments, the addition request message comprises a conditional indication and the target secondary node generates the identification information of the target primary secondary cell in the addition request acknowledge message in response to the condition indication in the addition request message.

In some embodiments, the identification information is an information element of the addition request acknowledge message.

In some embodiments, the identification information is included in a radio resource control message included in the addition request acknowledge message.

In some embodiments, the radio resource control message included in the addition request acknowledge message is a Cell-Group-Config, CG-Config, message.

In some embodiments, the identification information of the target primary secondary cell includes a frequency and a physical cell identity of the target primary secondary cell.

In some embodiments, the identification information of the target primary secondary cell includes a cell global identifier of the target primary secondary cell.

In some embodiments, the conditional indication is an information element of the release request message.

The present disclosure also relates to a method for a source base station. The method includes performing a handover preparation with a target base station, determining at least one recovery condition, and transmitting, to a user equipment, the at least one recovery condition to make the user equipment select a candidate cell satisfying at least one of the at least one recovery condition from at least one candidate cell to communicate with the target base station when at least one failure event occurs.

In some embodiments, the at least one recovery condition is a threshold.

In some embodiments, the at least one recovery condition is corresponding to all of the at least one candidate cell.

In some embodiments, each candidate cell is corresponding to at least one of the at least one recovery condition.

In some embodiments, the at least one failure event comprises at least one of radio link failure, a handover failure, an integrity check concerning Signaling Radio Bearer, SRB, 1 failure, an integrity check concerning Signaling Radio Bearer, SRB, 2 failure and a radio resource control connection reconfiguration failure.

The present disclosure relates to a method for a user equipment. The method includes receiving, from a source base station, at least one recovery condition, selecting a candidate cell satisfying at least one of the at least one recovery condition from at least one candidate cell when determining a failure event occurs, and communicating with a target base station via the selected candidate cell.

In some embodiments, the at least one recovery condition is a threshold.

In some embodiments, the at least one recovery condition is corresponding to all of the at least one candidate cell.

In some embodiments, each candidate cell is corresponding to at least one of the at least one recovery condition.

In some embodiments, the at least one failure event comprises at least one of radio link failure, a handover failure, an integrity check concerning Signaling Radio Bearer, SRB, 1 failure, an integrity check concerning Signaling Radio Bearer, SRB, 2 failure and a radio resource control connection reconfiguration failure.

The present disclosure relates to a network node which is accessed by a user equipment, UE, accessed a source secondary node. The network node includes a transmitting unit being configured to transmit, to a target secondary node, an addition request message, a receiving unit being configured to receive, from the target secondary node, an addition request acknowledge message with identification information of a target primary secondary cell in response to the addition request message, and a determining unit being configured to determine at least one mobility triggering condition of the target primary secondary cell, wherein the transmitting unit is further configured to transmitting, to the UE, a secondary node change type message having the at least one mobility triggering condition of the target primary secondary cell, to make the UE perform a handover from the source secondary node to the target secondary node when determining the target primary secondary cell meets at least one of the at least one mobility condition.

In some embodiments, the network node also includes a storage unit having program code stored therein, being configured to, when being executed, cause the network node to perform any of the aforementioned method steps.

The present disclosure also relates to a network node including a receiving unit being configured to receive from the master node, an addition request message, and a transmitting unit being configured to transmit, to the master node, an addition request acknowledge message with identification information of a target primary secondary cell in response to the addition request message.

In some embodiments, the network node also includes a storage unit having program code stored therein, being configured to, when being executed, cause the network node to perform any of the aforementioned method steps.

The present disclosure also relates to a network device accessed a master node and a source secondary node and including a receiving unit being configured to receive a secondary node change type message, from the master node, with at least one mobility triggering condition of a target primary secondary cell, a determining unit being configured to determine whether the target primary secondary cell fulfills the at least one mobility triggering condition, and an accessing unit being configured to access the target secondary node when the target primary secondary cell fulfills the at least one mobility triggering condition.

In some embodiments, the network device also includes a storage unit having program code stored therein, being configured to, when being executed, cause the network device to perform any of the aforementioned method steps.

The present disclosure relates to a network node which is accessed by a user equipment, UE, accessed a source secondary node. The network node includes a receiving unit being configured to receive, from the source secondary node, a change required message, and a transmitting unit being configured to transmit, to the target secondary node, an addition request message in response to the change required message, wherein the receiving unit is further configured to receive, from the target secondary node, an addition request acknowledge message with identification information of a target primary secondary cell in response to the addition request message, and wherein the transmitting unit is further configured to transmit, to the UE, a secondary node change type message having at least one mobility triggering condition of the primary secondary cell, to make the UE perform a handover from the source secondary node to the target secondary node when determining the target primary secondary cell meets at least one of the at least one mobility triggering condition.

In some embodiments, the network node also includes a storage unit having program code stored therein, being configured to, when being executed, cause the network node to perform any of the aforementioned method steps.

The present disclosure also relates to a network node including a processing unit being configured to perform a handover preparation with a target base station, a determining unit being configured to determine at least one recovery condition, and a transmitting unit being configured to transmit, to a user equipment, the at least one recovery condition to make the user equipment select a candidate cell satisfying at least one of the at least one recovery condition from at least one candidate cell to communicate with the target base station when at least one failure event occurs.

In some embodiments, the network node also includes a storage unit having program code stored therein, being configured to, when being executed, cause the network node to perform any of the aforementioned method steps.

The present disclosure also relates to a network device including a receiving unit being configured to receive, from a source base station, at least one recovery condition, a selecting unit being configured to select a candidate cell satisfying at least one of the at least one recovery condition from at least one candidate cell when determining a failure event occurs, and a communicating unit being configured to communicate with a target base station via the selected candidate cell.

In some embodiments, the network device also includes a storage unit having program code stored therein, being configured to, when being executed, cause the network device to perform any of the aforementioned method steps.

The present disclosure also relates to a computer-readable program medium code stored thereupon is disclosed according to an embodiment of the present disclosure, and the code, when executed by a processor, causing the processor to implement a method recited in any of foregoing described methods.

BRIEF DESCRIPTION OF THE DRAWINGS

Various example embodiments of the present disclosure are described in detail below with reference to the following Figures. The drawings are provided for purposes of illustration only and merely depict example embodiments of the present disclosure to facilitate the reader's understanding of the present disclosure.

Therefore, the drawings should not be considered limiting of the breadth, scope, or applicability of the present disclosure.

It should be noted that for clarity and ease of illustration these drawings are not necessarily drawn to scale.

Figure 1:
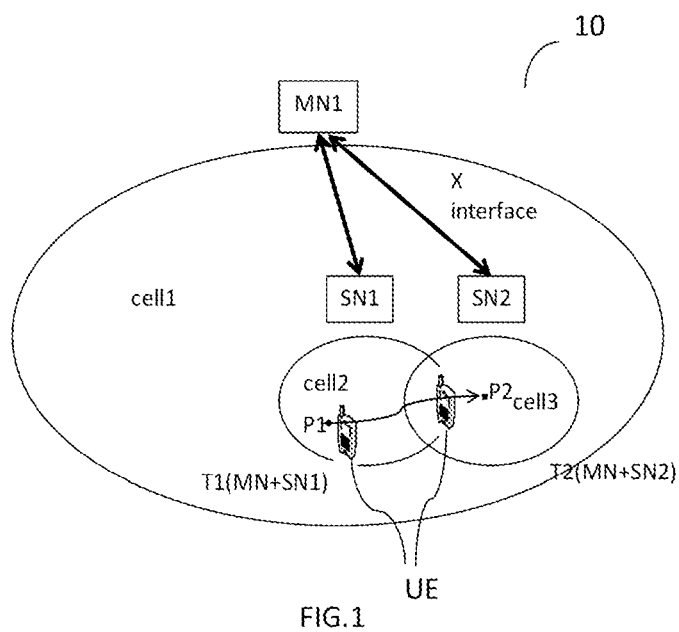

FIG. 1 shows an example of a schematic diagram of a wireless network according to an embodiment of the present disclosure.

Figure 2:
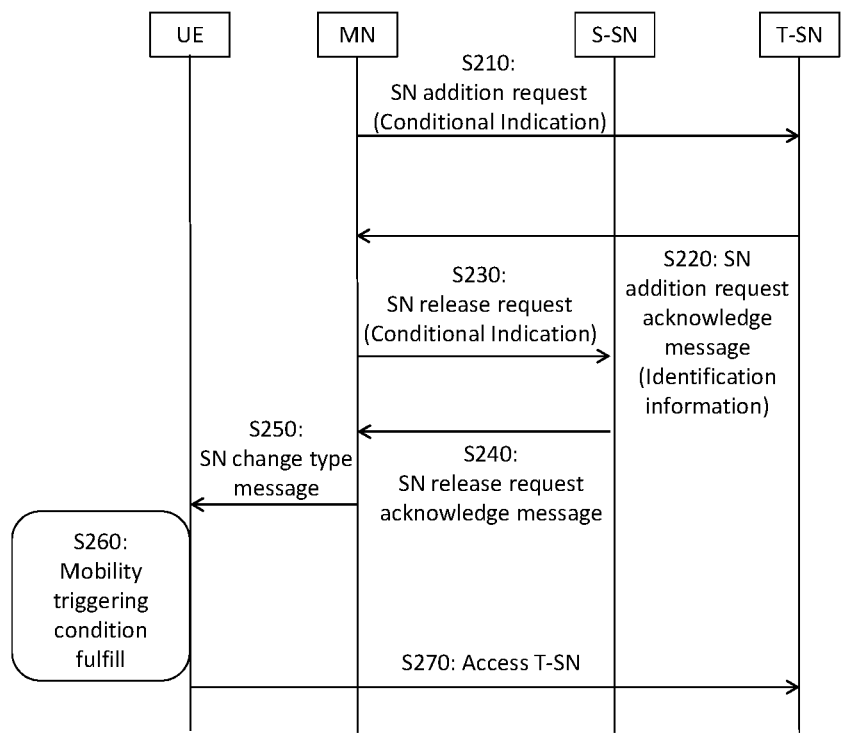

FIG. 2 shows an example of a secondary node change procedure according to an embodiment of the present disclosure.

Figure 3:
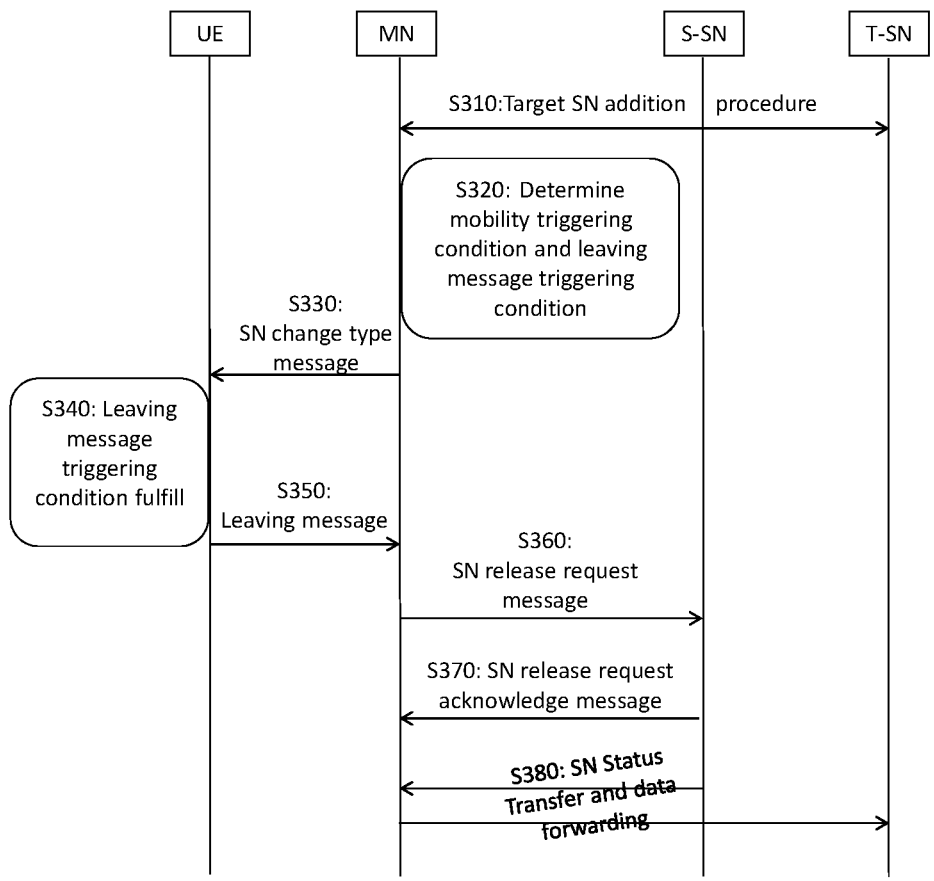

FIG. 3 shows an example of a secondary node change procedure according to an embodiment of the present disclosure.

Figure 4:
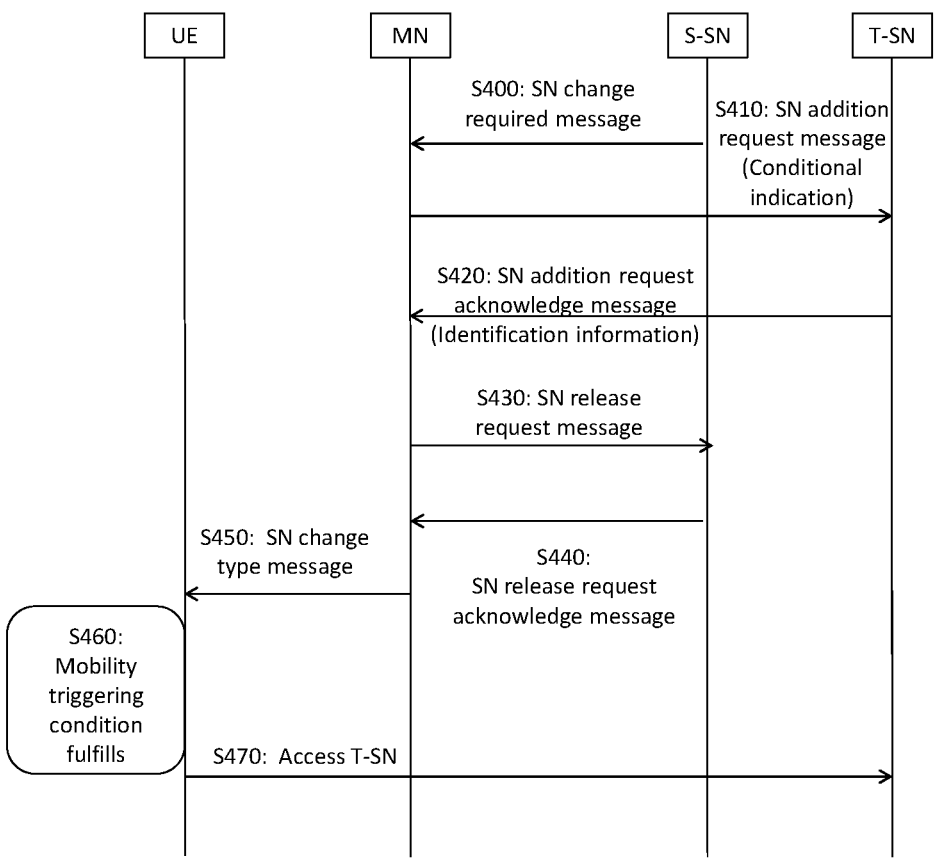

FIG. 4 shows an example of a secondary node change procedure according to an embodiment of the present disclosure.

Figure 5:
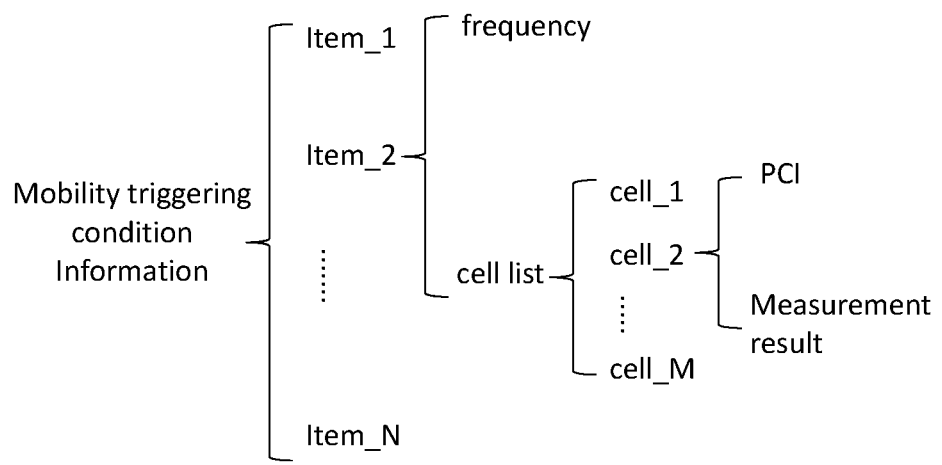

FIG. 5 shows a configuration of mobility triggering condition information according to an embodiment of the present disclosure.

Figure 6:
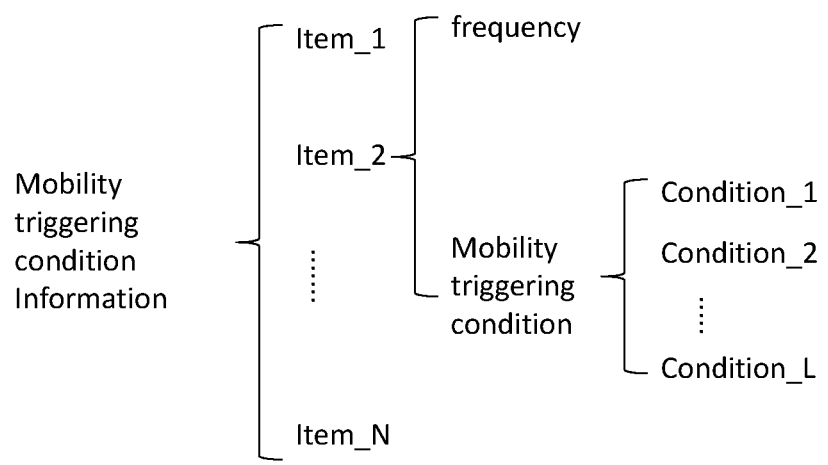

FIG. 6 shows a configuration of mobility triggering condition information according to an embodiment of the present disclosure.

Figure 7:
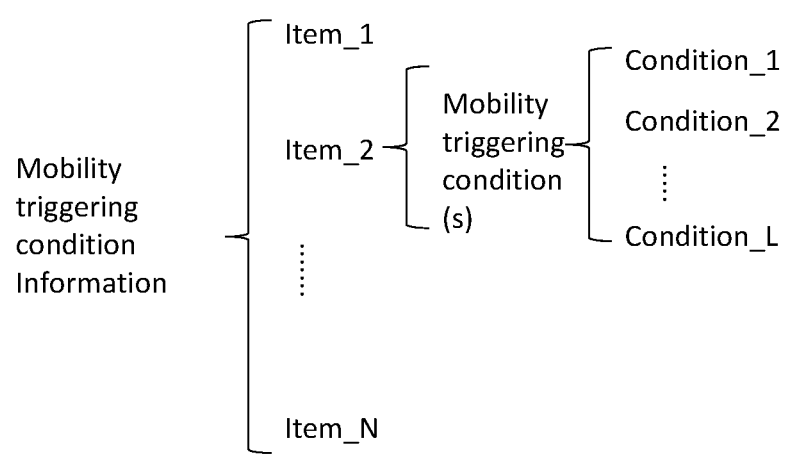

FIG. 7 shows a configuration of mobility triggering condition information according to an embodiment of the present disclosure.

Figure 8:
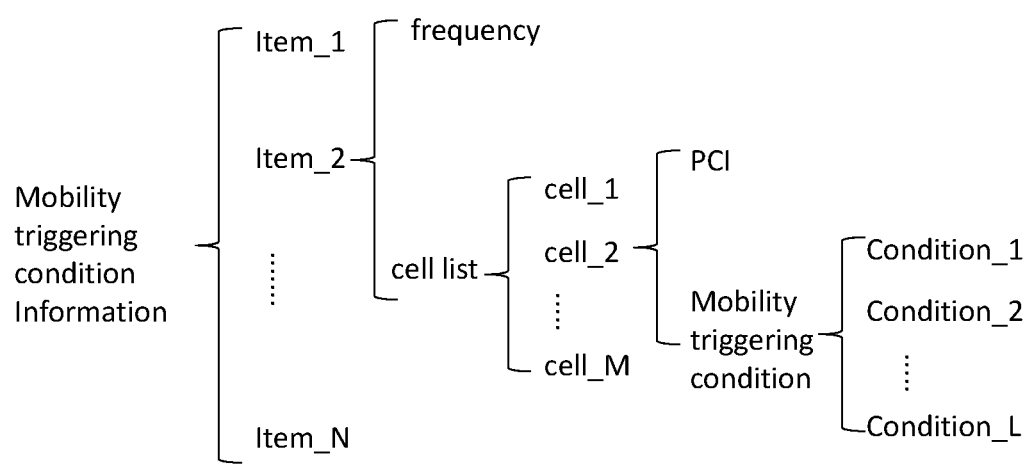

FIG. 8 shows a configuration of mobility triggering condition information according to an embodiment of the present disclosure.

Figure 9:
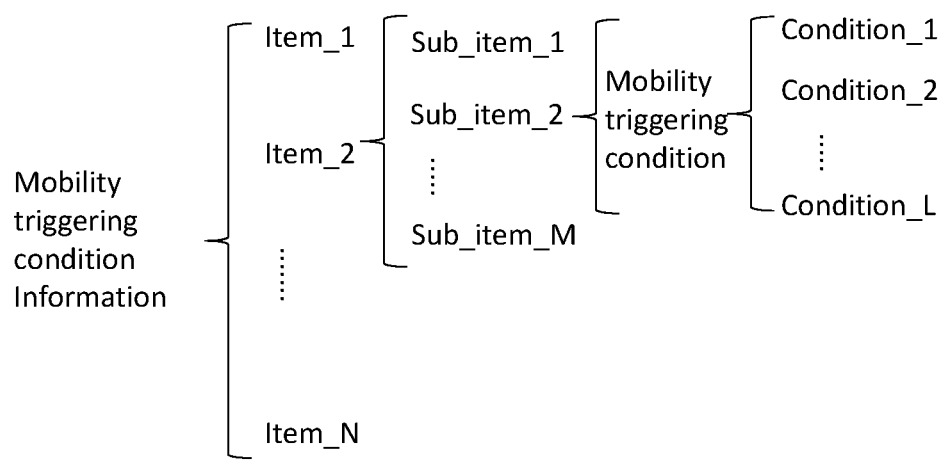

FIG. 9 shows a configuration of mobility triggering condition information according to an embodiment of the present disclosure.

Figure 10:
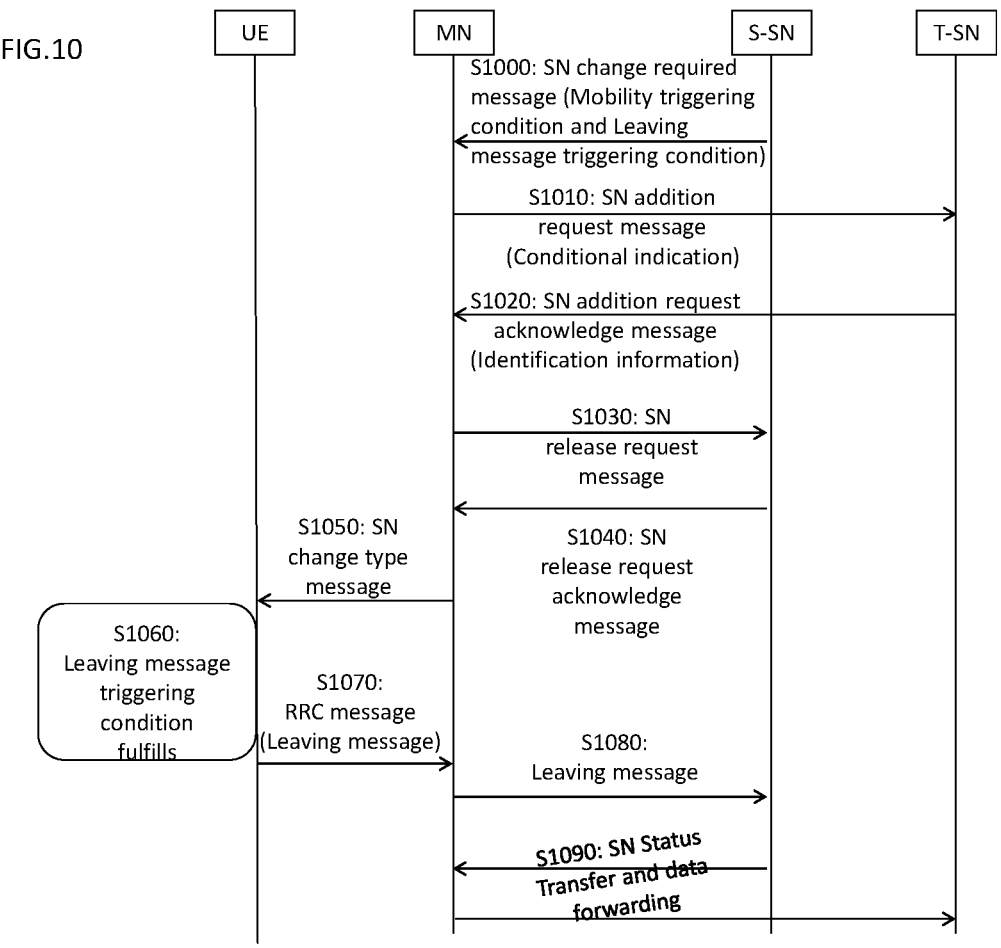

FIG. 10 shows an example of a secondary node change procedure according to an embodiment of the present disclosure.

Figure 11:
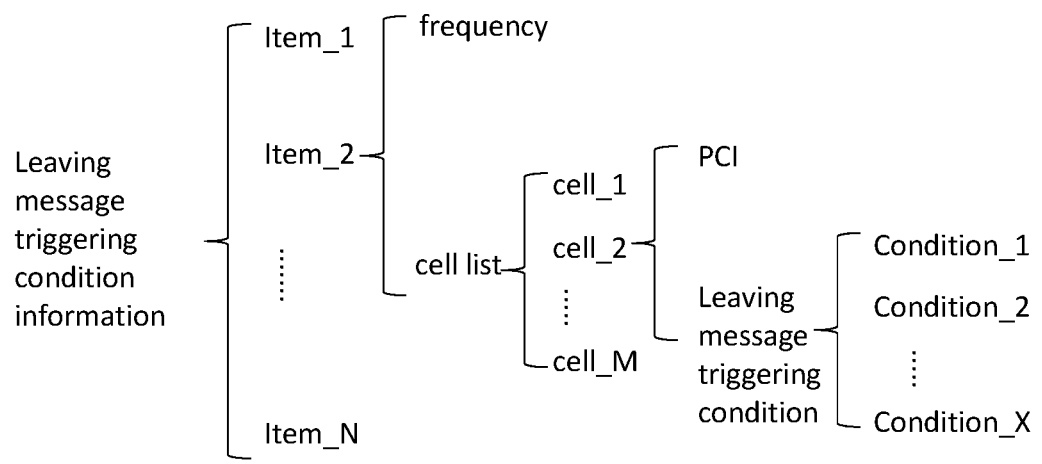

FIG. 11 shows a configuration of leaving message triggering condition information according to an embodiment of the present disclosure.

Figure 12:
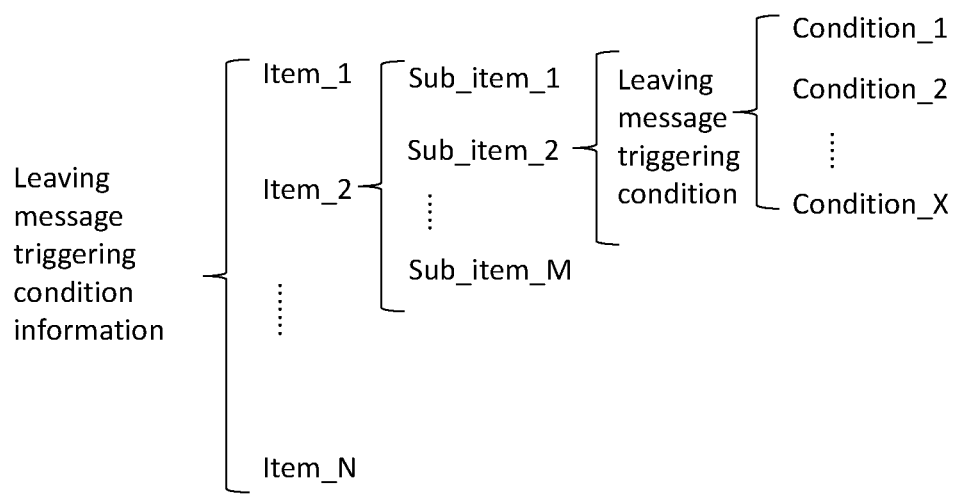

FIG. 12 shows a configuration of leaving message triggering condition information according to an embodiment of the present disclosure.

Figure 13:
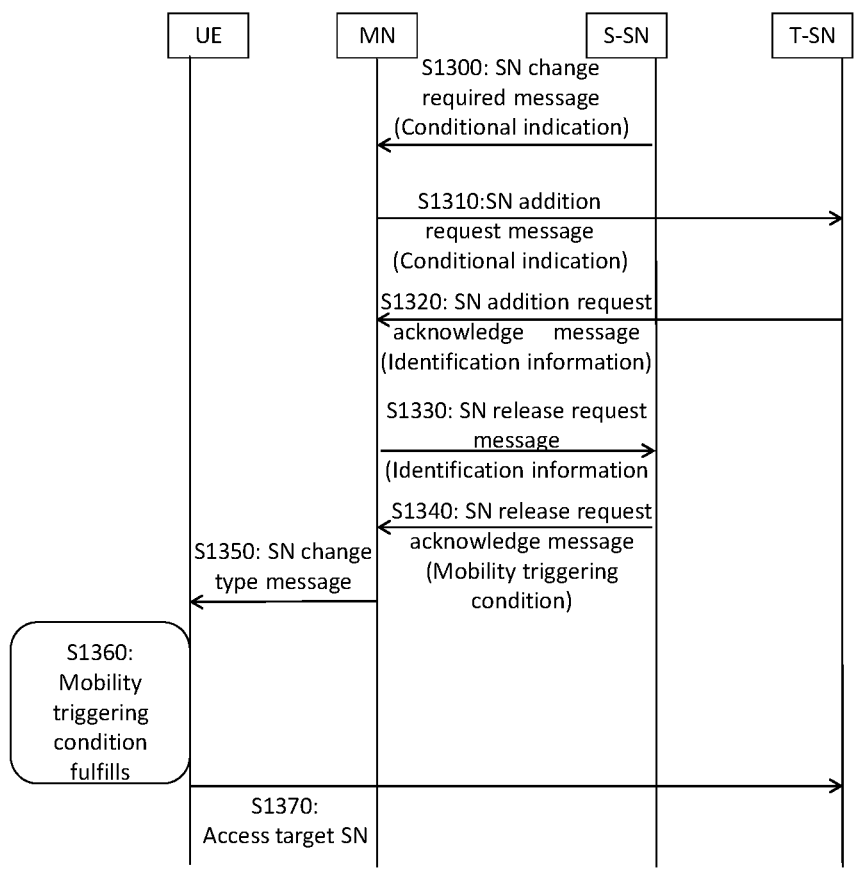

FIG. 13 shows an example of a secondary node change procedure according to an embodiment of the present disclosure.

Figure 14:
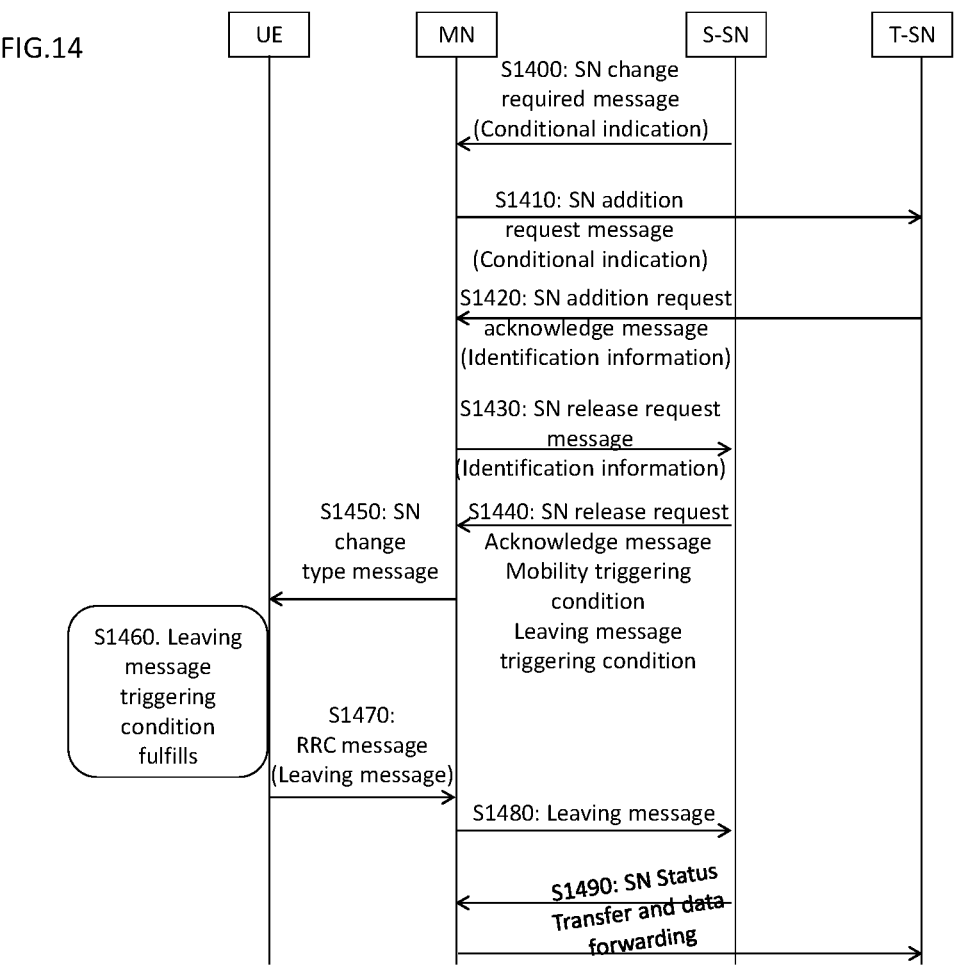

FIG. 14 shows an example of a secondary node change procedure according to an embodiment of the present disclosure.

Figure 15:
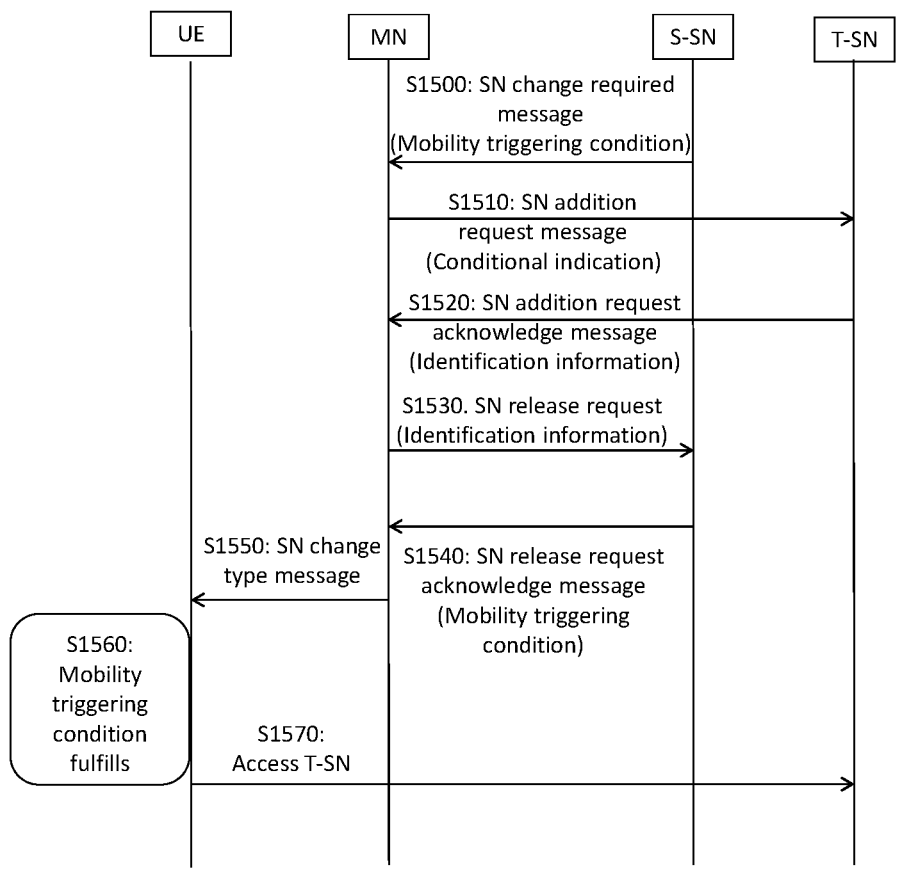

FIG. 15 shows an example of a secondary node change procedure according to an embodiment of the present disclosure.

Figure 16:
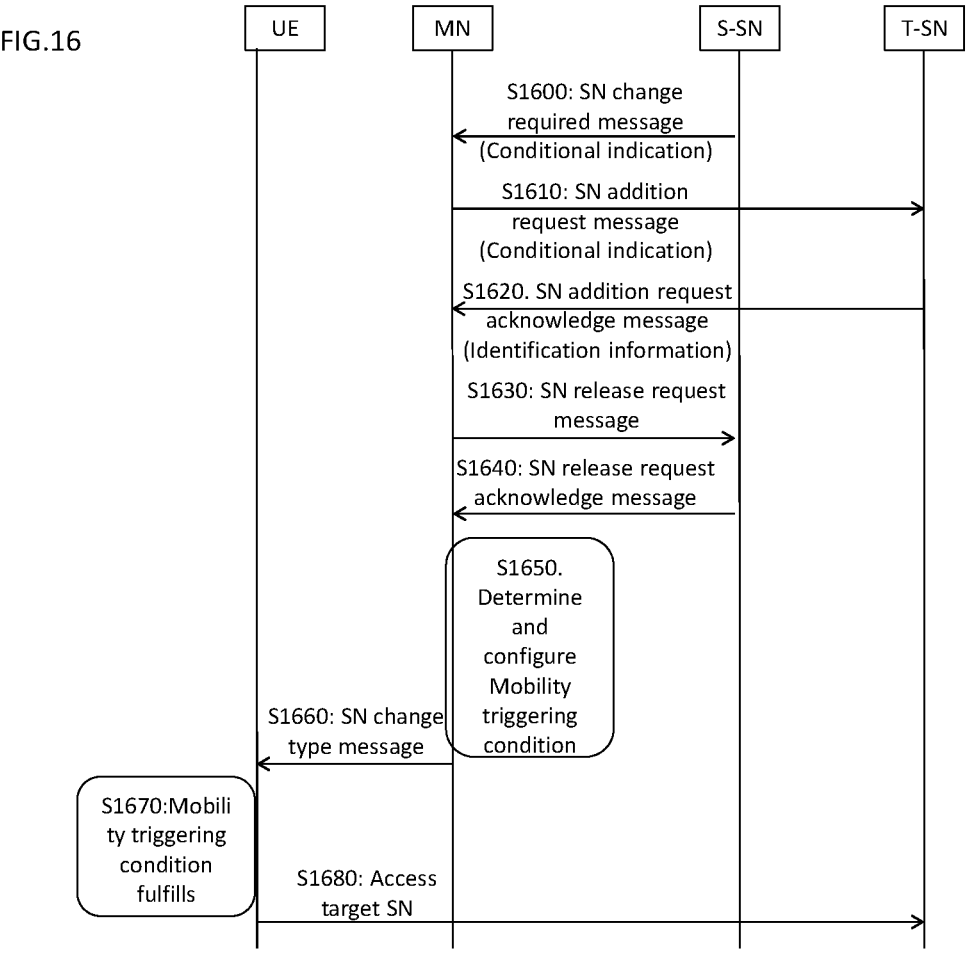

FIG. 16 shows an example of a secondary node change procedure according to an embodiment of the present disclosure.

Figure 17:
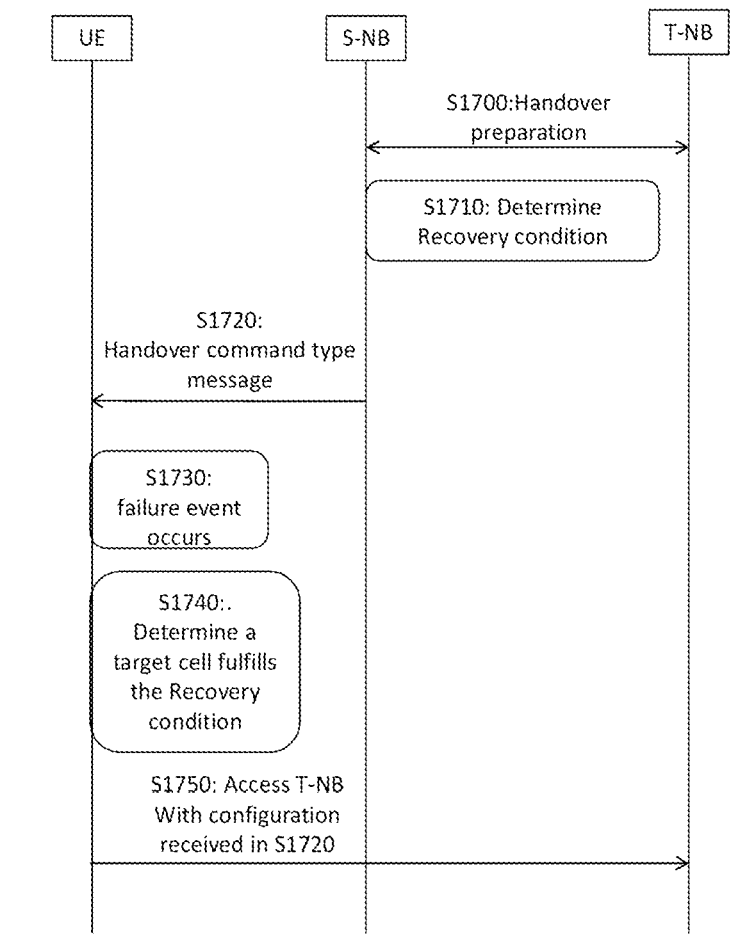

FIG. 17 shows an example of a fast recovery procedure according to an embodiment of the present disclosure.

Figure 18:
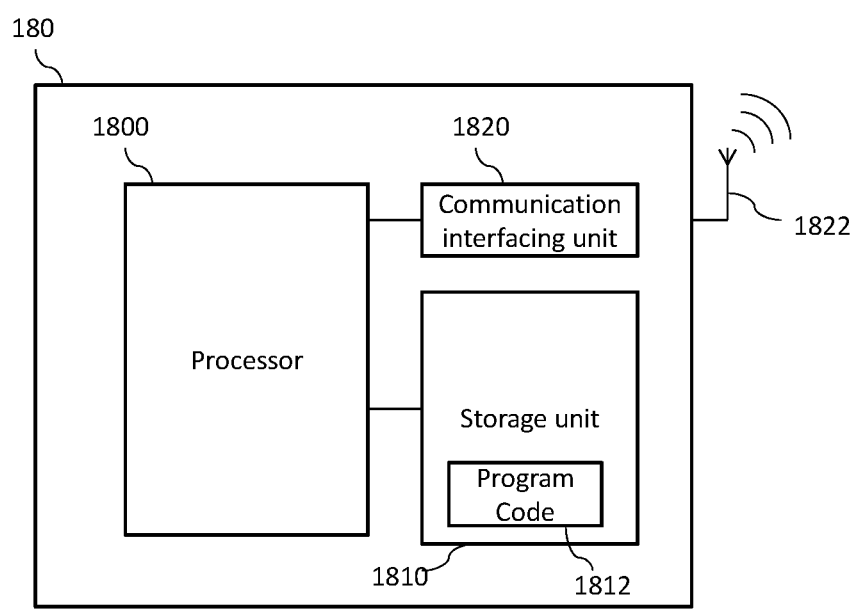

FIG. 18 shows an example of a schematic diagram of a network device according to an embodiment of the present disclosure.

Figure 19:
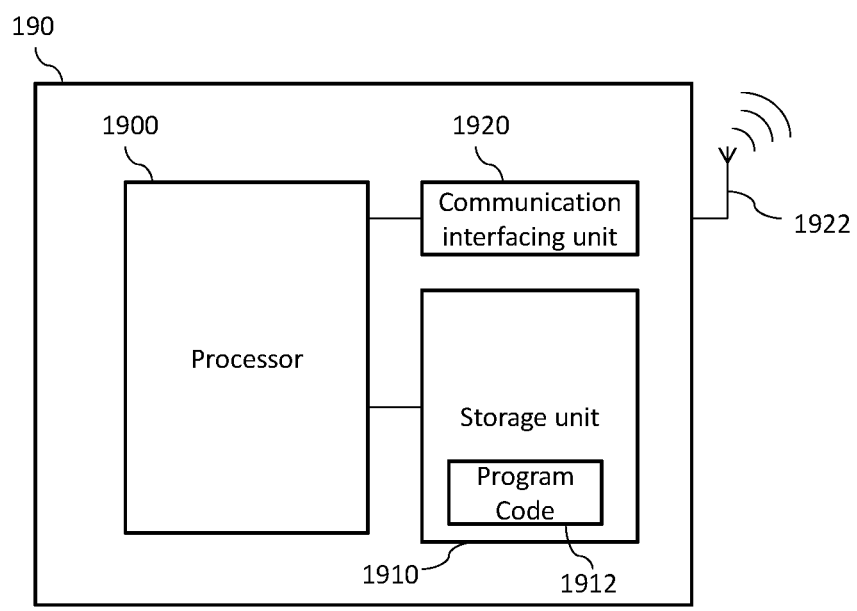

FIG. 19 shows an example of a schematic diagram of a network node according to an embodiment of the present disclosure.

DETAILED DESCRIPTION OF EXAMPLE EMBODIMENTS

Various example embodiments of the present disclosure are described below with reference to the accompanying figures to enable a skilled person to make and use the present disclosure. As would be apparent to those of ordinary skill in the art, after reading the present disclosure, various changes or modifications to the examples described herein can be made without departing from the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In a wireless network, a user equipment (UE) may operate in single connection or dual connectivity (DC), such as intra evolved universal terrestrial radio access (intra-E-UTRA) DC and multi-radio DC (MR-DC). When the UE operates in DC, the UE is configured to utilize resources provided by two different network nodes (e.g. base station, evolved nodeB (eNB) or the next generation nodeB (gNB)), where one of the network nodes acts as a master node (MN) and another one of the network nodes acts as a secondary node (SN). In an embodiment of intra-E-UTRA DC, both the MN and the SN provide E-UTRA accesses. In an embodiment of MR-DC, one of the MN and the SN provides an NR access and another one of the MN and the SN provides a E-UTRA access or an NR access. One or multiple serving cells can be configured both on MN and SN. In addition, serving cells configured on the MN are defined as a Master Cell Group (MCG) and serving cells configured on the SN are defined as a Secondary Cell Group (SCG). In the MCG or the SCG, there's one primary cell and the others are secondary cells. The primary cell in the MCG is denoted as PCell and the primary cell in the SCG is denoted as PSCell. When the UE operates in DC, a radio bearer (RB) can be configured to utilize either MCG resources (MCG bearer) or SCG resources (SCG bearer) or both MCG and SCG resources (split bearer).

FIG. 1 relates to a schematic diagram of a wireless network 10. The wireless network 10 comprises 3 network nodes MN1, SN1 and SN2 and a UE. In FIG. 1, the network nodes MN1, SN1 and SN2 respectively generate cells cell1, cell2 and cell3 and an X interface are deployed between the network nodes MN1 and SN1 or MN1 and SN2. In this embodiment, the UE operates in the DC. At a time T1, the UE is at a position P1 and access the network nodes MN1 and SN1, where the network node MN1 acts as the MN and the network node SN1 acts as the SN. From the time T1 to a time T2, the UE moves from the position P1 to a position P2 and changes to access the network nodes MN1 and SN2, where the network node MN1 acts as the MN and the network node SN2 acts as the SN. That is, a SN change occurs and the SN changes from the network node SN1 to SN2 with the movement from the position P1 to P2. In the following, various embodiments of a SN change procedure are provided to minimize an interruption time and to increase a reliability of the SN change.

FIG. 2 relates to a SN change procedure in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is, the UE operates in the DC between the MN and the source SN and accesses the MN and the source SN for data communications. In FIG. 2, a SN change procedure is disclosed for allowing the UE to change from accessing the MN and the source SN to accessing the MN and the target SN.

At beginning of the SN change procedure shown in FIG. 2, the MN transmits a SN addition request message to the target SN, to request the target SN to allocate resources for the UE by means of a SN addition process (step S210). In an embodiment, the MN may also transmit measurement results related to the target SN to the target SN. Note that, the MN would indicate the target SN that the SN change procedure is a conditional based procedure. That is, the SN change would occur when certain conditions are met and would thus not occur immediately. In an embodiment, the SN addition request message includes a conditional indication for indicating that the SN change procedure is the conditional based process. In an embodiment, the conditional indication is an information element of the SN addition request message. In another embodiment, the conditional indication is included in a radio resource control (RRC) message (e.g. a Cell-Group-Configinfo (CG-Configinfo) message) and the RRC message is included as an information element in the SN addition request message.

When receiving the SN addition request message, the target SN selects a target PSCell and optionally the SCells. The target SN may select the target PSCell and SCells based on measurement results related to the target SN which are received in the step S210. In addition, configurations of the target PSCell are generated by the target SN. The target SN allocates resources for the UE and generates configurations of the target PSCell and SCells. The target SN responds a SN addition request acknowledge message to the MN. In this embodiment, the SN addition request acknowledge message comprises identification information of the target PSCell (step S220).

In an embodiment, the target SN generates the identification information of the target PSCell in the SN addition request acknowledge message in response to the conditional indication indicating the conditional based process in the SN addition request message. In an embodiment, the target SN generates the identification information of the target PSCell in the SN addition request acknowledge message even if the SN addition request message does not include the conditional indication indicating the conditional based process.

In an embodiment, the identification information of the target PSCell includes a frequency and physical cell identity (PCI) of the target PSCell. In an embodiment, the identification information of the target PSCell includes a cell global indentifier (CGI) of the target PSCell.

In an embodiment, the identification information is included as an information element of the SN addition request acknowledge message. In an embodiment, the identification information is included in an RRC message (e.g. a Cell-Group-Config (CG-Config) message) and the RRC message is included as an information element in the SN addition request acknowledge message.

Next, the MN transmits a release request message to the source SN, to initiate a release process of releasing resources of the source SN configured to the UE (step S230). In the SN release request message, the MN indicates the source SN that the release process is a conditional based procedure. That is, the resources of the source SN configured for the UE should be released after certain conditions are met rather than be immediately released after the source SN receives the SN release request message. Thus, the source SN would keep the data communications with the UE after receiving the SN release request message.

In an embodiment, the SN release request message includes a conditional indication of indicating the release process is the conditional based procedure. In this embodiment, the source SN may keep the data communications with the UE in response to the conditional indication of the SN release request message. In an embodiment, the conditional indication of the SN release request message is an information element of the SN release request message. In another embodiment, the conditional indication of the SN release request message is included in an RRC message (e.g. a CG-Configinfo message) and the RRC message is included as an information element in the SN release request message. In an embodiment, the conditional indication of the SN release request message is a "Cause" value of the SN release request message. For example, the "Cause" value of the SN release request message may be set as "Conditional SN mobility".

In response to the SN release request message, the source SN transmits a SN release request acknowledge message to the MN (step S240). In a step S250, the MN determines at least one mobility triggering condition for the target PSCell and transmits a SN change type message including at least the RRC configuration message generated by the target SN and the at least one mobility triggering condition of the target PSCell to the UE, to make the UE perform a handover from the source SN to the target SN when determining the target PSCell fulfills at least one of the at least one mobility condition (i.e. condition based handover). In an embodiment, the SN change type message may be an RRC reconfiguration message.

After receiving the SN change type message, the UE keeps connection with the source SN and evaluates whether the target PSCell fulfills the at least one mobility triggering condition included in the SN change type message. When determining the target PSCell fulfills at least one of the at least one mobility triggering condition included in the SN change type message, the UE accesses the target SN via the target PSCell (steps S260 and S270).

When utilizing the quality of the source PSCell as the reference of performing the SN change, an undesired delay may occur if the quality of the source PSCell rapidly deteriorates when triggering the SN change procedure and may cause the SN change procedure fails. In the embodiment of FIG. 2, the MN initiates the SN change when the quality of the source PSCell is still good enough. Therefore, the failure due to the undesired delay caused by the deteriorated quality of the source PSCell can be avoided and the reliability of the SN change procedure can be improved.

If lossless data transmission is required for a resource block (RB), the source SN would stop the data transmission with the UE and transfer a sequence number status transfer (e.g. a sequence number status transfer) to the MN after the UE successfully changes to access the target SN. Meanwhile, the source SN would start forwarding data of unfinished data communications to the target SN. The data of the unfinished data communications may be transmitted directly from the source SN to the target SN (if there is a direct interface between the source SN and target SN) or be relayed by the MN to the target SN (if there is no direct interface between the source SN and target SN).

FIG. 3 shows a SN change procedure in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is, the UE operates in the DC between the MN and the source SN and accessed the MN and the source SN for data communications.

As shown in FIG. 3, the MN first starts a target SN addition procedure with the target SN at a step S310. The target SN addition procedure shown in FIG. 3 may comprise the steps S210 and S220 shown in FIG. 2. That is, the MN would receive the identification information of the target PSCell selected by the target SN in the step S310. Next, the MN determines not only at least on mobility triggering condition but also at least one leaving message triggering condition for the target PSCell, where the at least on mobility triggering condition is configured to trigger the UE to handover to or to change to access the target SN and the at least one leaving message triggering condition is configured to trigger the UE to send a leaving message for making the source SN start the Sequence number status transfer and the data forwarding.

Note that, the at least one mobility triggering condition and the at least one leaving message triggering condition are configured in such a way that the leaving message triggering condition would be triggered before the corresponded mobility triggering condition is triggered.

In an embodiment, the at least one mobility triggering condition and the at least one leaving message triggering condition can be configured as a same type of event, e.g. an event A3 defined in LTE measurement report triggering. In this embodiment, the MN configures a lower A3 offset parameter (a3-Offset) and/or a lower hysteresis parameter for the at least one leaving message triggering condition than those for the at least one mobility triggering condition.

In an embodiment, different type of events can be configured for the at least one mobility triggering condition and the at least one leaving message triggering condition. For example, the at least one mobility triggering condition is configured as an event A3 and the at least one leaving message triggering condition is configured as an event A2, where the events A2 and A3 are those defined in the LTE or NR measurement report triggering.

In an embodiment, the at least one mobility triggering condition can be configured as an event, e.g. the event A3, and the at least one leaving message triggering condition can be configured as a non-radio-resource-management (non-RRM) measurement event (i.e. an event other than the events for RRM measurements such as events A1 to A6 defined in the LTE or NR). The non-RRM measurement event can be evaluated either in an RRC layer or in the protocol layers below the RRC layer, e.g. the medium access control (MAC) layer. For example, the non-RRM measurement event can be an event that consecutive number of out of sync indication is received from a physical (PHY) layer.

After determining the at least one mobility triggering condition and the at least one leaving message triggering condition, the MN transmits a SN change type message (e.g. an RRC reconfiguration message) to the UE, to make the UE perform a handover from the source SN to the target SN when determining the target PSCell fulfills at least one of the at least one mobility triggering condition. The SN change type message includes the identification information of the target PSCell, the at least one mobility triggering condition and the at least one leaving message triggering condition (step S330). After receiving the SN change type message, the UE keeps connections with the source SN and evaluates whether the target PSCell fulfills the at least one mobility triggering condition and at least one leaving message triggering condition.

When determining the target PSCell fulfills the at least one leaving message triggering condition, the UE transmits a leaving message to the MN. In an embodiment, the leaving message may be a measurement report, an RRC message other than the measurement report or a MAC control element (CE) (step 350).

In an embodiment, the leaving message includes information capable of identifying the target PSCell. For example, the leaving message may include the identification information of the target PSCell received in the SN change type message. In an embodiment, the leaving message may include an identity of the fulfilled leaving message triggering condition when the MN in the step S330 associates unique identity to each leaving message triggering condition. The identity associated to the fulfilled leaving message triggering condition can be a new identity which is introduced for this purpose or can be the identity used to identify a measurement configuration (i.e. measurement identification). In an embodiment, the leaving message includes an index of the target PSCell. In an embodiment with 3 target PSCell candidates, the MN may associate indexes 1, 2, and 3 respectively to the 3 target PSCell candidates and the leaving message may include one of the indexes 1, 2, and 3 for indicating the target PSCell fulfilling the at least one leaving message triggering condition.

With the reception of the leaving message from the UE, the MN transmits a SN release request message to the source SN, to initiate a release process of releasing resources of the source SN configured to the UE (step S360). In the SN release request message, the MN may indicate the source SN that the release process is a conditional based procedure. For example, the SN release request message may include a conditional indication, where the conditional indication may be the same with that in the step S230.

With the reception of the SN release request message, the source SN transmits a Sequence number status transfer to the MN and the MN transmits the received Sequence number status transfer to the target SN. In addition, the source SN starts forwarding data of unfinished data transmission with the UE to the target SN through the MN (steps S370 and S380). In am embodiment, the data of unfinished data transmission with the UE may be transmitted from the source SN directly to the target SN if there's a direct interface between the source SN and target SN.

In the embodiment shown in FIG. 3, the MN initiates the release process of the source SN resource when receiving the leaving message from the UE and the source SN initiates the communications related to the Sequence number status transfer and data forwarding when receiving the SN release request message from the MN. As a result, the source SN can start data forwarding after the at least one leaving message triggering condition is met. Massive unnecessary data forwarding can be avoided, therefore.

In a case of MR-DC, the SN change can be initiated by the MN or the SN. In the followings, various embodiments of SN initiated SN change procedure are provided.

FIG. 4 relates to a SN change procedure in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is, the UE operates in the DC between the MN and the source SN and accessed the MN and the source SN for data communications.

In FIG. 4, the source SN initiates the SN change procedure by transmitting a SN change required message to the MN. To support the configuration of multiple candidate SCGs for the SN change procedure, the SN change required message may include a list of candidate target SNs. For each candidate target SN, the list contains the candidate target SN ID and/or the CG-Config message which contains the SCG configuration of the source SN and measurement results related to the candidate target SN.

In an embodiment, the source SN transmits at least one mobility triggering condition of each candidate target SN to the MN. The at least one mobility triggering condition of each candidate target SN is included in the CG-Config message.

In an embodiment, the at least one mobility triggering condition may be configured per frequencies on which the source SN transfers measurement results of the cells in the CG-Config message. That is, the at least one mobility triggering condition configured for a frequency is applied for all the cells on this frequency.

FIG. 5 relates to a configuration of Measurement Information2 included in the CG-Config message according to an embodiment of the present disclosure. Measurement Information2 is acquired by the source SN from the UE and whose measurement results are acquired by the UE according to the measurement configuration associated to the SCG. Typically, the Measurement Information2 is provided from the source SN to the MN and then relayed from the MN to the target SN during the SN change procedure.

As shown in FIG. 5, the Measurement Information2 includes a maximum list of N information elements, i.e. items Item_1 to Item_N. Each item contains the measurement results corresponding to a frequency. In addition to the corresponding frequency information, each item includes a list of maximum M information elements, i.e. cells cell_1 to cell_M, and each cell contains the PCI and the measurement results of each cell.

FIG. 6 relates to a configuration of mobility triggering condition information included in the CG-Config message according to an embodiment of the present disclosure. As shown in FIG. 6, the at least one mobility triggering condition is configured per frequency. The maximum number of items is the same as in the Measurement Information2.

FIG. 7 relates to a configuration of mobility triggering condition information included in the CG-Config message according to an embodiment of the present disclosure. As shown in FIG. 7, the at least one mobility triggering condition is configured per frequency. The maximum number of items is the same as in the Measurement Information2. In addition, the entry order in the mobility triggering condition information is the same as the order in the Measurement Information2. That is, the first entry (i.e. Item_1) of the mobility triggering condition information corresponds to the first entry in the Measurement Information2, the second entry (i.e. Item_2) of the mobility triggering condition information corresponds to the second entry in the Measurement Information2 and so on. In other words, the at least one mobility triggering condition configured in the item Item_1 of the mobility triggering condition information is for the cells on the frequency indicated in the first entry of the Measurement Information2, the at least one mobility triggering condition configured in the item Item_2 of the mobility triggering condition information is for the cells on the frequency indicated in the second entry of the Measurement Information2 and so on.

In an embodiment, the at least one mobility triggering condition may be configured per cells on which the source SN transfers measurement results in the CG-Config message. FIG. 8 relates to a configuration of mobility triggering condition information included in the CG-Config message according to an embodiment of the present disclosure. As shown in FIG. 8, the at least one mobility triggering condition is configured per cell. The maximum number of items Item_1 to Item_N is the same as that in the Measurement Information2 and the maximum number of cells within each item is the same as in that in the Measurement Information2.

FIG. 9 relates to a configuration of mobility triggering condition information included in the CG-Config message according to an embodiment of the present disclosure. As shown in FIG. 9, the at least one mobility triggering condition is configured per cell. The maximum number of items Item_1 to Item_N is the same as in that in the Measurement Information2 and the entry order of each item is the same as entry order of each item in the Measurement Information2. The entry order in the mobility triggering condition information is the same as the order in the Measurement Information2. That is, the first entry (i.e. Item_1) of the mobility triggering condition information corresponds to the first entry in the Measurement Information2, the second entry (i.e. Item_2) of the mobility triggering condition information corresponds to the second entry in the Measurement Information2 and so on.

In addition, the maximum number of sub-items Sub_Item_1 to Sub_Item_M within each item is the same as the maximum number of cells within each item in the Measurement Information2 and the entry order of each sub items within each item is the same as the entry order of each cells within the corresponding cell list in the Measurement Information2.

With reference to FIG. 4, the MN requests the target SN to allocate resources for the UE by transmitting a SN addition request message to the target SN for initiating the SN addition procedure, where the SN addition request message may include the measurement results related to the target SN received from the source SN (e.g. Measurement Information2) (step S410). When receiving the SN addition request message, the target SN selects a target PSCell and optionally the SCells. The target SN may select the target PSCell and SCells based on the measurement results related to the target SN which is received in the step S410. In addition, the target SN allocates resources for the UE and generates the configuration of the target PSCell and SCells. The target SN then responds a SN addition request acknowledge message to the MN (step S420).

Note that, the SN addition request acknowledge message includes identification information of the target PSCell. In an embodiment, the identification information of the target PSCell may change according to the configuration of the received measurement results. For example, the identification information of the target PScell may be a frequency of the target PSCell if the received measurement results are configured per frequency (e.g. the embodiments shown in FIGS. 5 to 7). In an embodiment, the identification information of the target PScell may be a frequency and PCI of the target PSCell or a CGI of the target PSCell if the measurement results are configured per cell (e.g. the embodiments shown in FIGS. 8 and 9).

In an embodiment, the identification information may be included as an information element of the SN addition request acknowledge message. In an embodiment, the identification information is included in an RRC message (e.g. a CG-Config message) and the RRC message is included as an information element in the SN addition request acknowledge message.

Next, the MN transmits a release request message to the source SN, to initiate a release process of releasing resources of the source SN configured to the UE and the source SN responses a SN release request acknowledge message to the MN (steps S430 and S440).

Subsequently, the MN transmits a SN change type message (e.g. an RRC reconfiguration message) to the UE, to make the UE perform a handover from the source secondary cell to the target secondary node when determining the target PSCell meets at least one of the at least one mobility triggering condition. The SN change type message includes at least the RRC configuration message generated by the target SN (e.g. RRC reconfiguration message) and the at least one mobility triggering condition (step S450). Note that the at least one mobility triggering condition here is the at least one mobility triggering condition of the target PSCell, which is indicated in the step S420, among the at least one mobility triggering condition received from the source SN in the step 400.

After receiving the at least one mobility triggering condition of the target PSCell, the UE keeps connection with the source SN and evaluates whether the target PSCell fulfills the received at least one mobility triggering condition. When determining the target PSCell fulfills the at least one mobility triggering condition, the UE starts accessing the target SN (steps S460 and S470).

In the embodiment shown in FIG. 4, the source SN initiates the SN change procedure when the quality of the source PSCell is still sufficiently good. The failure due to the undesired delay caused by the deteriorated quality of the source PSCell can be avoided. Thus, the reliability of the SN change procedure can be improved.

FIG. 10 relates to a SN change procedure in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is, the UE operates in the DC between the MN and the source SN and accessed the MN and the source SN for data communications.

In order to avoid massive unnecessary data forwarding during the SN change procedure, the source SN transmits not only at least one mobility triggering condition but also at least one leaving message triggering condition to the MN in a SN change required message initiating the SN change procedure (step S1000). Similar to the embodiment shown in FIG. 3, the source SN may configure the at least one mobility triggering condition but also the at least one leaving message triggering condition in such a way that the at least one leaving message triggering condition will be triggered ahead of the corresponding mobility triggering condition.

In an embodiment, the source SN transmits the at least one mobility triggering condition and the at least one leaving message triggering condition in the CG-Config message. Note that the at least one mobility triggering condition may be configured according to the embodiments shown in FIGS. 5 to 9.

In an embodiment where the at least one leaving message triggering condition is contained in the CG-Config message, one of the at least one leaving message triggering condition may be applied for all cells whose measurement results are included in the CG-Config message.

In an embodiment where the at least one leaving message triggering condition is contained in the CG-Config message, the at least one leaving message triggering condition may be configured per cell whose measurement results are included in the CG-Config message.

FIG. 11 shows a configuration of leaving message triggering condition information according to an embodiment of the present disclosure, where the leaving message triggering condition information includes the at least one leaving message triggering condition in the step S1000. In FIG. 11, the at least one leaving message triggering condition is configured per cell whose measurement results are included in the CG-Config message. As shown in FIG. 11, the maximum number of items Item_1 to Item_N is the same as that in the Measurement Information2 and the maximum number of cells within each item is the same as that in the Measurement Information2.

FIG. 12 shows a configuration of leaving message triggering condition information according to an embodiment of the present disclosure, where the leaving message triggering condition information includes the at least one leaving message triggering condition in the step S1000. In FIG. 12, the at least one leaving message triggering condition is configured per cell whose measurement results are included in the CG-Config message. In FIG. 12, the maximum number of items Item_1 to Item_N is the same as that in the Measurement Information2 and the entry order of each item is the same as entry order of each item in the Measurement Information2. That is, the first entry (Item_1) in the leaving message triggering condition information corresponds to the first entry in the Measurement Information2, the second entry (Item_2) in the leaving message triggering condition information corresponds to the second entry in the Measurement Information2 and so on. In addition, the maximum number of sub-items Sub_item_1 to Sub_item_M within each item is the same as the maximum number of cells within each item in the Measurement Information2 and the entry order of each sub-items within each item is the same as the entry order of each cell within the corresponding cell list in the Measurement Information2.

After receiving the SN change required message from the source SN, the MN transmits a SN addition request message to the target SN, the target SN responds a SN addition request acknowledge message to the MN, the MN transmits a SN release request message to the source SN and the source SN responses a SB release request acknowledge message to the MN (steps S1010 to S1040). Regarding the details of the steps S1010 to 1040 reference is made to the steps S410 to S440 and are a repetition is avoided herein for brevity.

Next, the MN transmits a SN change type message to the UE, to make the UE perform a handover from the source SN to the target SN when determining the target PSCell fulfills at least one of the at least one mobility triggering condition. In FIG. 10, the SN change type message includes at least the RRC configuration message generated by the target SN (e.g. an RRC reconfiguration message), the at least one mobility triggering condition and the at least one leaving message triggering condition. Note that the at least one mobility triggering condition and the at least one leaving message triggering condition are those of the target PSCell, which is indicated in the step S1020, among the at least one mobility triggering condition and the at least one leaving message triggering condition received in step S1000.

In step S1060, the UE keeps connection with the source SN and evaluates whether the target PScell fulfills the at least one mobility triggering condition and the at least one leaving message triggering condition received in the step S1050.

When determining that the target PScell fulfills the at least one leaving message triggering condition, the UE transmits an RRC message (e.g. ULInformationTranferMRDC), including a leaving message to MN and the MN transmits the leaving message included in the received RRC message to the source SN (steps 1070 and 1080).

In an embodiment, the leaving message may be a measurement report or an RRC message other than the measurement report.

On the other hands, the leaving message may include information capable of identifying the target PSCell. In an embodiment, the leaving message may include the identification information of the target PSCell received in the SN change type message. In an embodiment, the leaving message may include an identity of the fulfilled leaving message triggering condition when the identity is associated, by the MN in the step 1050, to the fulfilled leaving message triggering condition. The identity associated to the fulfilled leaving message triggering condition may be a new identity which is introduced for this purpose or may be the identity used to identify a measurement configuration (i.e. measurement identification). In an embodiment, the leaving message includes an index of the target PSCell fulfilling the at least one leaving message condition if the MN associates an identity to each target PSCell candidate. In an embodiment with 3 target PSCell candidates, the MN may associate indexes 1, 2, and 3 respectively to the 3 target PSCell candidates and the leaving message may include one of the indexes 1, 2, and 3 for indicating the target PSCell fulfilling the at least one leaving message triggering condition.

When receiving the leaving message, the source SN transmits a sequence number status transfer to the MN and the MN transmits the received Sequence number status transfer to the target SN. In addition, the source SN starts forwarding data of unfinished data transmissions with the UE to the target SN through the MN (step S1090). In an embodiment, the data of unfinished data transmission with the UE may be transmitted from the source SN directly to the target SN if there is a direct interface between the source SN and target SN.

FIG. 13 shows a SN change procedure in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is, the UE operates in the DC between the MN and the source SN and accessed the MN and the source SN for data communications (i.e. operates in DC).

To initiate the SN change procedure, the source SN transmits a SN change required message to the MN (Step 1300). In this embodiment, the SN change required message indicates the MN that the SN change procedure is a conditional based procedure. For example, the SN change required message may include a conditional indication of indicating the SN change procedure is a conditional based procedure. In an embodiment, the conditional indication is an information element of the SN change required message. In another embodiment, the conditional indication is included in an RRC message (e.g. a CG-Config message) and the RRC message is included as an information element in the SN change required message.

Next, the MN requests the target SN to allocate resources for the UE by transmitting a SN addition request message to the target SN for initiating the SN addition procedure (step 1310). When receiving the SN addition request message, the target SN selects a target PSCell and optionally the SCells, allocates resources for the UE and generates the configuration of the target PSCell and SCells. The target SN then responds a SN addition request acknowledge message to the MN (step S1320).

Note that, the SN addition request acknowledge message includes identification information of the target PSCell. In an embodiment, the identification information may be included as an information element of the SN addition request acknowledge message. In an embodiment, the identification information is included in an RRC message (e.g. a CG-Config message) and the RRC message is included as an information element in the SN addition request acknowledge message.

In addition, the SN addition request message in step 1310 may include a conditional indication of indicating the SN change procedure is a conditional based procedure. In an embodiment, the target SN generates the identification information of the target PSCell in the SN addition request acknowledge in response to the conditional indication in the SN addition request message.

After receiving the SN addition request acknowledge message, the MN transmits a SN release request message to the source SN, to initiate releasing resources of the source SN configured to the UE and the source SN responses a SN release request acknowledge message to the MN (steps S1330 and S1340).

In the embodiment shown in FIG. 13, the SN release request message includes the identification information of the target PSCell received from the target SN. In an embodiment, the identification information may be included as an information element of the SN release request message. In an embodiment, the identification information is included in an RRC message (e.g. a CG-Configinfo message) and the RRC message is included as an information element in the SN release request message.

On the other hands, the SN release request acknowledge message in the step S1340 includes at least one mobility triggering condition for the target PSCell, where the at least one mobility triggering condition may be included in an RRC message (e.g. CG-Config message).

Subsequently, the MN transmits a SN change type message (e.g. an RRC reconfiguration message) to the UE, to make the UE perform a handover from the source SN to the target SN when determining the target PSCell fulfills at least one of the at least one mobility triggering condition. The SN change type message includes at least the RRC configuration message generated by the target SN (e.g. RRC reconfiguration message) and the at least one mobility triggering condition (step S1350). Note that, the at least one mobility triggering condition is that receiving from the source SN in the step 1340.

After receiving the at least one mobility triggering condition of the target PSCell, the UE keeps connection with the source SN and evaluates whether the target PSCell fulfills the received at least one mobility triggering condition. When determining the target PSCell fulfills the at least one mobility triggering condition, the UE changes to access the target SN (steps S1360 and S1370).

FIG. 14 shows a SN change procedure in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is the UE operates in the DC between the MN and the source SN and accessed the MN and the source SN for data communications.

To initiate the SN change procedure, the source SN transmits a SN change required message to the MN (Step 1400). Similar to the embodiment shown in FIG. 13, the SN change required message indicates the MN that the SN change procedure is a conditional based procedure. For example, the SN change required message may include a conditional indication of indicating the SN change procedure is a conditional based procedure. In an embodiment, the conditional indication is an information element of the SN change required message. In another embodiment, the conditional indication is included in an RRC message (e.g. a CG-Config message) and the RRC message is included as an information element in the SN change required message.

Next, the MN requests the target SN to allocate resources for the UE by transmitting a SN addition request message to the target SN for initiating the SN addition procedure (step 1410). When receiving the SN addition request message, the target SN selects a target PSCell and optionally the SCells, allocates resources for the UE and generates the configuration of the target PSCell and SCells. The target SN then responds a SN addition request acknowledge message to the MN (step S1420).

Note that, the SN addition request acknowledge message includes identification information of the target PSCell. In an embodiment, the identification information may be included as an information element of the SN addition request acknowledge message. In an embodiment, the identification information is included in an RRC message (e.g. a CG-Config message) and the RRC message is included as an information element in the SN addition request acknowledge message.

In addition, the SN addition request message in step 1410 may include a conditional indication of indicating the SN change procedure is a conditional based procedure. In an embodiment, the target SN generates the identification information of the target PSCell in the SN addition request acknowledge in response to the conditional indication in the SN addition request message.

After receiving the SN addition request acknowledge message, the MN transmits a SN release request message to the source SN, to initiate releasing resources of the source SN configured to the UE and the source SN responses a SN release request acknowledge message to the MN (steps S1430 and S1440).

In the embodiment shown in FIG. 14, the SN release request message includes the identification information of the target PSCell received from the target SN. In an embodiment, the identification information may be included as an information element of the SN release request message. In an embodiment, the identification information is included in an RRC message (e.g. a CG-Configinfo message) and the RRC message is included as an information element in the SN release request message.

On the other hands, the SN release request acknowledge message in the step S1440 includes not only at least one mobility triggering condition but also at least one leaving message triggering condition for the target PSCell, where the at least one mobility triggering condition and the at least one leaving message triggering condition for the target PSCell the may be included in an RRC message (e.g. CG-Config message).

Next, the MN transmits a SN change type message to the UE, to make the UE perform a handover from the source SN to the target SN when determining the target PSCell fulfills at least one of the at least one mobility triggering condition. In FIG. 14, the SN change type message includes at least the RRC configuration message generated by the target SN (e.g. an RRC reconfiguration message), the at least one mobility triggering condition, and the at least one leaving message triggering condition. Note that, the at least one mobility triggering condition, and the at least one leaving message triggering condition are those of the target PSCell, which is indicated in the step S1420, among the at least one mobility triggering condition and the at least one leaving message triggering condition received in step S1400.

In a step S1460, the UE keeps connection with the source SN and evaluates whether the target PScell fulfills the at least one mobility triggering condition and the at least one leaving message triggering condition received in the step S1450.

When determining the target PScell fulfills the at least one leaving message triggering condition, the UE transmits an RRC message (e.g. ULInformationTranferMRDC), including a leaving message to MN and the MN transmits the leaving message included in the received RRC message to the source SN (steps 1470 and 1480).

In an embodiment, the leaving message may be a measurement report or an RRC message other than the measurement report.

On the other hands, the leaving message may include information capable of identifying the target PSCell. In an embodiment, the leaving message may include the identification information of the target PSCell received in the SN change type message. In an embodiment, the leaving message may include an identity of the fulfilled leaving message triggering condition when the identity is associated, by the MN in the step 1450, to the fulfilled leaving message triggering condition. The identity associated to the fulfilled leaving message triggering condition may be a new identity which is introduced for this purpose or may be the identity used to identify a measurement configuration (i.e. measurement identification). In an embodiment, the leaving message includes an index of the target PSCell fulfilling the at least one leaving message condition if the MN associates an identity to each target PSCell candidate. In an embodiment with 3 target PSCell candidates, the MN may associate indexes 1, 2, and 3 respectively to the 3 target PSCell candidates and the leaving message may include on of the indexes 1, 2, and 3 for indicating the target PSCell fulfilling the at least one leaving message triggering condition.

When receiving the leaving message, the source SN transmits a Sequence number status transfer to the MN and the MN transmits the received Sequence number status transfer to the target SN. In addition, the source SN starts forwarding data of unfinished data transmission with the UE to the target SN through the MN (step S1490). In an embodiment, the data of unfinished data transmission with the UE may be transmitted from the source SN directly to the target SN if there's a direct interface between the source SN and target SN.

FIG. 15 shows a SN change procedure in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is, the UE operates in the DC between the MN and the source SN and accessed the MN and the source SN for data communications.

In the embodiment shown in FIG. 15, operations of the MN, the source SN, the target SN and the UE in steps S1500 to S1570 are similar to those in the steps S400 to S470 shown in FIG. 4 and are not described herein for brevity. In the embodiment shown in FIG. 15, the target PSCell selected by the target SN may not have corresponding mobility triggering condition in the at least one mobility triggering condition received in the step S1500. Under such a condition, the MN transmits the identification information of the target PSCell in the SN release request message to the source SN and the source SN transmits the at least one mobility condition for the target PSCell in the SN release request acknowledge message to MN (steps S1530 and S1540).

FIG. 16 shows a handover process for the SN change in a wireless network according to an embodiment of the present disclosure, where the wireless network comprises a UE, a MN, a source SN (S-SN) and a target SN (T-SN). In an embodiment, the UE, the MN, the source SN and the target SN may be the UE, the network nodes MN1, SN1 and SN2 shown in FIG. 1, respectively. That is, the UE operates in the DC between the MN and the source SN and accessed the MN and the source SN for data communications.

To initiate the SN change procedure, the source SN transmits a SN change required message to the MN (Step 1600). In this embodiment, the SN change required message indicates the MN that the SN change procedure is a conditional based procedure. For example, the SN change required message may include a conditional indication of indicating the SN change procedure is a conditional based procedure. In an embodiment, the conditional indication is an information element of the SN change required message. In another embodiment, the conditional indication is included in an RRC message (e.g. a CG-Config message) and the RRC message is included as an information element in the SN change required message.

Next, the MN requests the target SN to allocate resources for the UE by transmitting a SN addition request message to the target SN for initiating the SN addition procedure (step 1610). When receiving the SN addition request message, the target SN selects a target PSCell and optionally the SCells, allocates resources for the UE and generates the configuration of the target PSCell and SCells. The target SN then responds a SN addition request acknowledge message to the MN (step S1620).

Note that, the SN addition request acknowledge message includes identification information of the target PSCell. In an embodiment, the identification information may be included as an information element of the SN addition request acknowledge message. In an embodiment, the identification information is included in an RRC message (e.g. a CG-Config message) and the RRC message is included as an information element in the SN addition request acknowledge message.

In addition, the SN addition request message in step 1610 may include a conditional indication of indicating that the SN change procedure is a conditional based procedure. In an embodiment, the target SN generates the identification information of the target PSCell in the SN addition request acknowledge in response to the conditional indication in the SN addition request message.

After receiving the SN addition request acknowledge message, the MN transmits a SN release request message to the source SN, to initiate releasing resources of the source SN configured to the UE and the source SN responses a SN release request acknowledge message to the MN (steps S1630 and S1640).

In this embodiment, the at lease one mobility triggering condition for the target PSCell is determined and configured by the MN (step 1650).

After determining and configuring the at lease one mobility triggering condition for the target PSCell, the MN transmits a SN change type message (e.g. an RRC reconfiguration message) to the UE, to make the UE perform a handover from the source secondary cell to the target secondary node when determining the target primary secondary cell meets one of the at least one mobility condition (i.e. condition based handover). The SN change type message includes at least the RRC configuration message generated by the target SN (e.g. RRC reconfiguration message) and the determined at least one mobility triggering condition (step S1660) for the target PSCell.

After receiving the at least one mobility triggering condition of the target PSCell, the UE keeps connection with the source SN and evaluates whether the target PSCell fulfills the received at least one mobility triggering condition. When determining the target PSCell fulfills the at least one mobility triggering condition, the UE changes to access the target SN (steps S1670 and S1680).

FIG. 17 shows a fast recovery procedure in a wireless network according to an embodiment of the present disclosure. The wireless network includes a UE, a source NodeB (S-NB) and a target NodeB (T-NB).

In FIG. 17, the S-NB initiates a handover preparation with the T-NB (step S1700). Next, the S-NB determines at least one recovery condition for at least one candidate cell (step S1710). In an embodiment, the at least one recovery condition is configured per candidate cell. That is, each of the at least one candidate cells is corresponding to at least one of the at least one recovery condition. In an embodiment, the at least one recovery condition is applied to all of the at least candidate cells.

After determining the at least one recovery condition, the S-NB transmits a handover command type message (e.g. an RRC reconfiguration message) to the UE (step S1720). The handover command type message includes at least the RRC configuration message including the at least one candidate cell generated by the T-NB and the determined at least one recovery condition.

In a step 1730, the UE detects whether a failure event occurs, where the failure event includes a radio link failure, a handover failure (e.g. re-configuration with sync failure), an integrity check concerning signaling resource bearer type SRB1 or SRB2, and RRC connection reconfiguration failure.

When determining at least one failure event occurs, the UE determines the at least one candidate cell received in the step S1720 fulfills its corresponding at least one recovery condition as a target cell. For example, a candidate cell Y is received in the step S1720 and is configured with a quality threshold X. When the at least one failure event occurs, the UE may determine the candidate cell Y as the target cell if detecting an quality of the candidate cell Y corresponding to the quality threshold X satisfies the threshold X (i.e. the candidate cell Y fulfills its corresponding at least one recovery condition). In one embodiment, when determining at least one failure event occurs, the UE starts a timer Tx. The UE determines the at least one candidate cell received in the step S1720 fulfills its corresponding at least one recovery condition as a target cell before the timer Tx expires. In one embodiment, the UE determines the at least one candidate cell received in the step S1720 fulfills its corresponding at least one recovery condition as a target cell before the timer Tx expires, the UE stops the timer Tx. In one embodiment, in case the timer Tx expires, the UE initiates a RRC connection re-establishment procedure.

Next, the UE access the T-NB with the configuration of the target cell which is received in the step S1720. In one embodiment, the UE starts a timer Ty when initiating accessing the T-NB with the configuration of the target cell which is received in the step S1720. In one embodiment, if Ty expires, the UE initiates a RRC connection re-establishment procedure.

In comparison with initiating an RRC connection re-establishment procedure when the failure event occurs to the UE, the fast recovery procedure disclosed in FIG. 17 is able to avoid resulting in a long interruption to the UE.

FIG. 18 relates to a schematic diagram of a network device 180 according to an embodiment of the present disclosure. The network device 20 may be a user equipment (UE), a mobile phone, a laptop, a tablet computer, an electronic book or a portable computer system and is not limited herein. The network device 180 may include a processor 1800 such as a microprocessor or Application Specific Integrated Circuit (ASIC), a storage unit 1810 and a communication interfacing unit 1820. The storage unit 1810 may be any data storage device that stores a program code 1812, which is accessed and executed by the processor 200. Embodiments of the storage unit 1812 include but are not limited to a subscriber identity module (SIM), read-only memory (ROM), flash memory, random-access memory (RAM), hard-disk, and optical data storage device. The communication interfacing unit 1820 may be a transceiver and is used to transmit and receive signals (e.g. messages or packets) according to processing results of the processor 1800. In an embodiment, the communication interfacing unit 1820 transmits and receives the signals via an antenna 1822 shown in FIG. 18.

In an embodiment, the storage unit 1810 and the program code 1812 may be omitted and the processor 1800 may include a storage unit with stored program code.

The processor 1800 may implement any one of the foregoing described steps on the network device 180.

The communication interfacing unit 1820 may be a transceiver. The communication interfacing unit 1820 may as an alternative or in addition be combining a transmitting unit and a receiving unit configured to transmit and to receive, respectively, signals to and from a network node (e.g. a base station).

FIG. 19 relates to a schematic diagram of a network node 190 according to an embodiment of the present disclosure. The network node 190 may be a base station (BS), a network entity, a Mobility Management Entity (MME), Serving Gateway (S-GW), Packet Data Network (PDN) Gateway (P-GW), or Radio Network Controller (RNC), and is not limited herein. The network node 190 may include a processor 1900 such as a microprocessor or ASIC, a storage unit 19100 and a communication interfacing unit 1920. The storage unit 1910 may be any data storage device that stores a program code 1912, which is accessed and executed by the processor 1900. Examples of the storage unit 1912 include but are not limited to a SIM, ROM, flash memory, RAM, hard-disk, and optical data storage device. The communication interfacing unit 1920 may be a transceiver and is used to transmit and receive signals (e.g. messages or packets) according to processing results of the processor 1900. In an example, the communication interfacing unit 1920 transmits and receives the signals via an antenna 1922 shown in FIG. 19.

In an embodiment, the storage unit 260 and the program code 1912 may be omitted the processor 1900 may include a storage unit with stored program code.

The processor 1900 may implement any one of the foregoing described steps on the network device 190.

The communication interfacing unit 1920 may be a transceiver. The communication interfacing unit 1920 may as an alternative or in addition be combining a transmitting unit and a receiving unit configured to transmit and to receive, respectively, signals to and from a network device (e.g. a UE) or another network node.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must/can precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for a master node which is accessed by a user equipment (UE), the UE accessed a source secondary node, the method comprising:

transmitting, to a target secondary node, an addition request message comprising a conditional indication, receiving, from the target secondary node, an addition request acknowledge message with identification information of a target primary secondary cell in response to the addition request message, determining at least one mobility triggering condition of the target primary secondary cell, and transmitting, to the UE, a secondary node change type message having the at least one mobility triggering condition of the target primary secondary cell, to make the UE perform a handover from the source secondary node to the target secondary node when determining the target primary secondary cell meets at least one of the at least one mobility triggering condition, wherein the identification information of the target primary secondary cell in the addition request acknowledge message is generated, by the target secondary node, in response to the conditional indication of the addition request message.

2. The method of claim 1, wherein the identification information is an information element of the addition request acknowledge message, and wherein the identification information of the target primary secondary cell includes a cell global identifier of the target primary secondary cell.

3. The method of claim 1, wherein the identification information is included in a radio resource control message included in the addition request acknowledge message, and wherein the identification information of the target primary secondary cell includes a frequency and a physical cell identity of the target primary secondary cell.

4. A method for a master node which is accessed by a user equipment, UE, the UE accessed a source secondary node, the method comprising:

receiving, from the source secondary node, a change required message, wherein the change required message comprises a conditional indication for indicating the master node a secondary node change procedure indicated by the change required message is a condition based procedure, transmitting, to a target secondary node, an addition request message in response to the change required message, wherein the addition request message comprise a conditional indication, receiving, from the target secondary node, an addition request acknowledge message with identification information of a target primary secondary cell in response to the addition request message, and transmitting, to the UE, a secondary node change type message having at least one mobility triggering condition of the target primary secondary cell, to make the UE perform a handover from the source secondary node to the target secondary node when determining the target primary secondary cell meets at least one of the at least one mobility triggering condition, wherein the change required message comprises the at least one mobility triggering condition of the target primary secondary cell.

5. The method of claim 4, wherein the identification information of the target primary secondary cell in the addition request acknowledge message is generated, by the target secondary node, in response to the condition indication in the addition request message.

6. The method of claim 4, wherein the identification information is an information element of the addition request acknowledge message, and wherein the identification information of the target primary secondary cell includes a cell global identifier of the target primary secondary cell.

7. The method of claim 4, wherein the identification information is included in a radio resource control message included in the addition request acknowledge message, and wherein the identification information of the target primary secondary cell includes a frequency and a physical cell identity of the target primary secondary cell.

8. The method of claim 4, wherein the change required message comprises a list of candidate target secondary nodes.

9. The method of claim 8, wherein, for each candidate target secondary node, the list of candidate target secondary nodes comprises at least one of an identifier of the candidate target secondary node, or a radio resource control message contains a secondary cell group configuration of the source secondary node and measurement results related to the candidate target secondary nodes.

10. A network node comprising a processor and a storage unit, wherein the processor is configured to read a program code from the storage unit and implement a method comprising:

transmitting, by the network node to a target secondary node, an addition request message comprising a conditional indication, receiving, by the network node from the target secondary node, an addition request acknowledge message with identification information of a target primary secondary cell in response to the addition request message, determining at least one mobility triggering condition of the target primary secondary cell, and transmitting, by the network node to a user equipment (UE), a secondary node change type message having the at least one mobility triggering condition of the target primary secondary cell, to make the UE perform a handover from a source secondary node to the target secondary node when determining the target primary secondary cell meets at least one of the at least one mobility triggering condition, wherein the identification information of the target primary secondary cell in the addition request acknowledge message is generated, by the target secondary node, in response to the conditional indication of the addition request message.

11. The network node of claim 10, wherein the identification information is an information element of the addition request acknowledge message, and wherein the identification information of the target primary secondary cell includes a cell global identifier of the target primary secondary cell.

12. The network node of claim 10, wherein the identification information is included in a radio resource control message included in the addition request acknowledge message, and wherein the identification information of the target primary secondary cell includes a frequency and a physical cell identity of the target primary secondary cell.

13. A network node comprising a processor and a storage unit, wherein the processor is configured to read a program code from the storage unit and implement a method comprising:

receiving, by the network node from a source secondary node, a change required message, wherein the change required message comprises a conditional indication for indicating a master node a secondary node change procedure indicated by the change required message is a condition based procedure, transmitting, by the network node to a target secondary node, an addition request message in response to the change required message, wherein the addition request message comprise a conditional indication, receiving, by the network node from the target secondary node, an addition request acknowledge message with identification information of a target primary secondary cell in response to the addition request message, and transmitting, by the network node to a user equipment (UE), a secondary node change type message having at least one mobility triggering condition of the target primary secondary cell, to make the UE perform a handover from the source secondary node to the target secondary node when determining the target primary secondary cell meets at least one of the at least one mobility triggering condition, wherein the change required message comprises the at least one mobility triggering condition of the target primary secondary cell.

14. The network node of claim 13, wherein the identification information of the target primary secondary cell in the addition request acknowledge message is generated, by the target secondary node, in response to the condition indication in the addition request message.

15. The network node of claim 13, wherein the identification information is an information element of the addition request acknowledge message, and wherein the identification information of the target primary secondary cell includes a cell global identifier of the target primary secondary cell.

16. The network node of claim 13, wherein the identification information is included in a radio resource control message included in the addition request acknowledge message, and wherein the identification information of the target primary secondary cell includes a frequency and a physical cell identity of the target primary secondary cell.

17. The network node of claim 13, wherein the change required message comprises a list of candidate target secondary nodes.

18. The network node of claim 17, wherein:
for each candidate target secondary node, the list of candidate target secondary nodes comprises at least one of an identifier of the candidate target secondary node, or
a radio resource control message contains a secondary cell group configuration of the source secondary node and measurement results related to the candidate target secondary nodes.

* * * * *